United States Patent [19]

Shigemoto et al.

[11] Patent Number: 4,983,674

[45] Date of Patent: Jan. 8, 1991

[54] HOT MELT ADHESIVE COMPOSITIONS

[75] Inventors: Hiromi Shigemoto, Iwakuni; Masami Takeda, Otake; Tsuneaki Muro, Iwakuni, all of Japan

[73] Assignee: Mitsui Petrochemical Industries, Ltd., Tokyo, Japan

[21] Appl. No.: 230,456

[22] Filed: Aug. 10, 1988

[30] Foreign Application Priority Data

Aug. 11, 1987 [JP] Japan ................... 62-200236

[51] Int. Cl.$^5$ ............... C09J 153/02; C09J 109/06
[52] U.S. Cl. ........................ 525/97; 525/98; 525/211; 525/216; 525/232
[58] Field of Search ............... 525/232, 97, 98, 211, 525/216, 232, 241

[56] References Cited

U.S. PATENT DOCUMENTS

| | | | |
|---|---|---|---|
| 4,210,686 | 7/1980 | Gajewski | 525/95 |
| 4,714,749 | 12/1987 | Hughes | 525/98 |
| 4,787,897 | 11/1988 | Torimae | 428/343 |

FOREIGN PATENT DOCUMENTS

| | | |
|---|---|---|
| 289609 | 11/1988 | European Pat. Off. . |
| 126445 | 7/1984 | Japan . |
| 02767 | 4/1988 | PCT Int'l Appl. . |

OTHER PUBLICATIONS

Synonyms of Chemical Abstracts Registry Number 25213-96-1.

*Primary Examiner*—John C. Bleutge
*Assistant Examiner*—David Buttner
*Attorney, Agent, or Firm*—Sherman & Shalloway

[57] ABSTRACT

A hot melt adhesive composition which comprises:
(a) a copolymer of vinyl aromatic compounds and conjugated dienic compounds, or a hydrogenated version thereof in amounts of about 20–70% by weight;
(b) a tackifier comprising alicyclic hydrocarbon polymers in amounts of about 30–80% by weight; and
(c) a 4-methylpentene-1 polymer in amounts of about 0.3–20% by weight, based on the composition, respectively.

10 Claims, No Drawings

HOT MELT ADHESIVE COMPOSITIONS

This invention relates to a hot melt adhesive composition, and more particularly to a hot melt adhesive composition which retains a high adhesion at high temperatures.

Conventional hot melt adhesive compositions for use in the production of such as labels, kraft adhesive tapes or cloth adhesive tapes usually contain polyvinyl acetates or ethylene-vinyl acetate copolymers as a base resin. These known hot melt adhesive compositions are in general inferior in adhesion to polymers such as polyethylene, polypropylene, polyethylene terephthalate, polyvinyl chloride or poly (4-methylpentene-1), and moreover they have a disadvantage in that the adhesive force is remarkably reduced when being exposed to high temperatures.

Therefore, there has been used recently a hot melt adhesive composition which is composed of styrene/aliphatic diene block copolymers and tackifiers composed of alicyclic hydrocarbon polymers. This hot melt adhesive composition has in fact an excellent adhesive force at low temperatures, but they are readily reduced in adhesive force when being heated in, for example, hot water or in microwave ovens.

The present inventors have made intensive investigations to improve the adhesive force of (a) vinyl aromatic compound/conjugated diene copolymers which are exemplified by styrene/aliphatic diene block copolymers, or hydrogenated versions thereof, and (b) tackifiers composed of alicyclic hydrocarbon polymers, at elevated temperatures, and found that the incorporation of 4-methylpentene-1 polymers in the above hot melt adhesive compositions remarkably improves the adhesive force at elevated temperatures.

It is therefore an object of the invention to provide a hot melt adhesive composition which has an excellent adhesive force at low temperatures, but also retains a high adhesive force at elevated temperatures, for example, when being heated in hot water or microwave ovens.

The hot melt adhesive composition of the invention comprises:

(a) a copolymer of vinyl aromatic compounds and conjugated dienic compounds, or a hydrogenated version thereof, in amounts of about 20–70% by weight;
(b) a tackifier comprising alicyclic hydrocarbon polymers in amounts of about 30–80% by weight; and
(c) a 4-methylpentene-1 polymer in amounts of about 0.3–20% by weight, based on the composition, respectively.

The copolymer of vinyl aromatic compounds and conjugated dienic compounds used in the invention is a block copolymer or a random copolymer, and may be either linear, radial or branched. The vinyl aromatic compound used is vinylbenzenes or vinylnaphthalenes which are unsubstituted or substituted with one or more of alkyls each usually of 1–12 carbons, and are exemplified by styrene, α-methylstyrene, vinyltoluene, p-tert.-butylstyrene, vinylxylene, ethylvinylxylene, or vinylnaphthalene. Styrene is most preferred among the above, however, a mixture of two or more of the above may also be used. The conjugated dienic compound used is an aliphatic one composed of 4–6 carbons, and may be substituted with a halogen such as chlorine. Thus the dienic compound used in the invention include, for example, 1,3-butadiene, isoprene, 1,3-pentadiene, 2,3-dimethylbutadiene and chloroprene. A mixture of one or more of these may be used, if necessary. However, 1,3-butadiene, isoprene or a mixture of these are preferred, and 1,3-butadiene or isoprene is most preferred.

The block copolymer of vinyl aromatic compounds and conjugated dienic compounds per se are already known, as is described in Japanese Patent Laid-Open No. 52-150457 (corresponding to U.S. Pat. No. 4,041,103) and No. 53-71158. By way of example, the block copolymer used in the invention is represented by X-Y-X$^1$, X-Y, X(Y-X-Y)nX or X(Y-X)nY wherein X and X$^1$ each represent a block composed of vinyl aromatic compounds, and may be the same or different; Y represents a block composed of conjugated dienic compounds; and n is usually in the range of 1–10. Among these is preferred a block copolymer which has blocks composed of vinyl aromatic compounds, i.e., X or X$^1$ at the terminals.

The block copolymer used in the invention has preferably a number average molecular weight of about 10,000–1,000,000, and more preferably of about 20,000–300,000. The block of vinyl aromatic compounds is preferably of an average molecular weight of about 1000–500,000, more preferably of about 2000–300,000, and the block of conjugated dienic compounds is preferably of an average molecular weight of about 1000–500,000, more preferably of about 2000–300,000. It is further preferred that the weight ratio of the vinyl aromatic compounds to conjugated dienic compounds in the block copolymer is in the range of from about 2/98 to 60/40, with a weight ratio of from about 10/90 to 40/60 most preferred.

There may be specifically mentioned as examples of the copolymer of vinyl aromatic compounds and conjugated dienic compounds, styrene/butadiene random copolymers, styrene/isoprene random copolymers, polybutadiene/polystyrene block copolymers, polystyrene/polybutadiene/polystyrene block copolymers, polystyrene/polyisoprene/polystyrene block copolymers and poly(α-methylstyrene)/polybutadiene/poly(α-methylstyrene) block copolymers.

A hydrogenated version of the above described copolymer is also usable in the invention. In particular a hydrogenated copolymer is preferred in which not less than about 90% of the aliphatic double bonds and not more than about 10% of the aromatic double bonds are hydrogenated, most preferably not less than about 99% of the aliphatic double bonds and not more than about 5% of the aromatic double bonds are hydrogenated.

The hydrogenation of the copolymer of vinyl aromatic compounds and conjugated dienic compounds may be carried out by any method known in the technology of hydrogenation. Therefore, in the production of the hydrogenated version, a known hydrogenation catalyst is used, for example, nickel/porous diatomaceous earth, Raney nickel, copper dichromate, molybdenum sulfide, platinum/carbon or palladium/carbon. The reaction may be carried out usually at from room temperatures to about 320° C. under pressures of about 5–200 kg/cm$^2$ for 0.1–24 hours.

When styrene and butadiene are used as a vinyl aromatic monomer and a dienic monomer, respectively, the hydrogenated version of the block copolymer is a polystyrene/poly(ethylene/butene) block copolymer. When styrene and isoprene are used as a vinyl aromatic monomer and a dienic monomer, respectively, the hydrogenated version of the block copolymer is a polystyrene/polypropyene block copolymer.

The aforesaid copolymer of vinyl aromatic compounds and conjugated dienic compounds and their hydrogenated versions are commercially available. For example, Cariflex TR-1101, TR-1107 and TR-4113 by Shell Chemical; Kraton G-6500, G-6521, G-1650, G-1652 and G-1657 by Shell Chemical; and Solprene and Hydrogenated Solprene by Philips may be mentioned among others. For instance, Cariflex TR-1107 is a polystyrene/polyisoprene/polystyrene block copolymer, and Cariflex TR-4113 is a polystyrene/polybutadiene/polystyrene block copolymer; Kraton G-1650 and 1652 are polystyrene/poly(ethylene/butene)/polystyrene block copolymers; and Solprene is a polystyrene/polybutadiene block copolymer.

The copolymer of vinyl aromatic compounds and conjugated dienic compounds and their hydrogenated versions may be used as a mixture.

The hot melt adhesive composition of the invention contains the above copolymer of vinyl aromatic compounds and conjugated dienic compounds or its hydrogenated version in amounts of about 20-70% by weight, preferably of about 30-50% by weight, based on the hot melt composition. When the content is less than about 20% by weight, the resultant hot melt adhesive composition is of insufficient heat resistance, whereas when the content is more than about 70% by weight, the resultant hot melt adhesive composition has a high viscosity and has no good workability.

The hot melt adhesive composition of the invention contains a tackifier comprising alicyclic hydrocarbon polymers or resins. The tackifier used is a resin-like material which is obtained by hydrogenation of conventional tackifiers containing therein unsaturated linkages, either aromatic or ethylenic, and has an average number molecular weight of about 200-2000. Thus, the tackifier used is a liquid or solid resin-like material which has a softening point of from about 40° C. to about 150° C., and provides tackiness or adhesiveness to the composition.

Thus, there may be mentioned as examples of such tackifiers, hydrogenated versions of petroleum resin tackifiers or thermally polymerized dicyclopentadiene tackifiers. The tackifiers comprising petroleum resins or thermally polymerized dicyclopentadiene, and their hydrogenated versions are well known in the art, and are available commercially from various sources. For example, a hydrogenated version of petroleum resin tackifier is available as "Alcon P-100" by Arakawa Kagaku Kogyo K. K., Japan.

More preferably, the tackifier used in the invention has a softening point of not less than about 80° C., most preferably of not less than about 140° C. since when the softening point is less than about 80° C., the resultant hot melt adhesive composition is rather of insufficient heat resistance, whereas when the more than about 140° C., the resultant hot melt adhesive composition has a rather high viscosity and is less workable.

The hot melt adhesive composition of the invention contains the above tackifier in amounts of about 30-80% by weight, preferably of about 50-60% by weight, based on the composition so as to possess an excellent heat resistance and a suitable viscosity in handling.

The hot melt adhesive composition of the invention further contains, as an essential component, a 4-methylpentene-1 polymer. The 4-methylpentene-1 polymer used includes not only a homopolymer of 4-methylpentene-1 or poly(4-methylpentene-1), but also a copolymer of 4-methylpentene-1 with a comonomer copolymerizable therewith. Preferred comonomers are α-olefins of 2-20 carbons, such as ethylene, propylene, 1-butene, 1-hexene, 1-octene, 1-decene, 1-tetradecene and 1-octadecene. The copolymer used, however, is preferably mainly composed of 4-methylpentene-1, and most preferably the copolymer contains the 4-methylpentene-1 component in amounts of not less than about 85 mole %.

Further, the 4-methylpentene-1 polymer used in the invention preferably has an intrinsic viscosity $[\eta]$ in the range of from about 0.6 to about 2.0 dl/g, more preferably of 0.8 to about 1.2 dl/g, as determined in decalin at temperatures of 135° C. When the intrinsic viscosity $[\eta]$ is less than about 0.6 dl/g, the resultant hot melt adhesive composition melts and flows at high temperatures, whereas when the intrinsic viscosity $[\eta]$ is more than about 2.0 dl/g, the resultant composition has a high melt viscosity and is less workable.

The production of such poly(4-methylpentene-1) resins and copolymers of 4-methylpentene-1 as above described is well known, and they are available from Mitsui Petrochemical Industries, Ltd., Japan.

When necessary, the 4-methylpentene-1 polymer may be heated to temperatures of about 300°-350° C. and decomposed partially so that the resultant polymer has an intrinsic viscosity $[\eta]$ of about 0.6-2.0 dl/g.

The 4-methylpentene-1 polymer is contained in the hot melt adhesive composition in amounts of about 0.3-20% by weight, preferably of about 2-5% by weight, so that the resultant hot melt adhesive composition is of highly heat resistance and suitable viscosity in handling.

When necessary, the hot melt adhesive composition may further contain therein additives such as softeners, stabilizers, fillers or antioxidants.

The hot melt adhesive composition of the invention may be produced by a method known in the art. By way of example, the ingredients and, if necessary, the additives as above-mentioned are heated and melted together in a Brabender, and then molded into desired shapes such as granules, flakes, pellets or sticks. In the use of the composition, it is heated and melted, and then applied to a substrate, for example, cloth or kraft paper, in usual manners by any known means.

As set forth above, the hot melt adhesive composition of the invention contains the 4-methylpentene-1 polymer in addition to the copolymer of vinyl aromatic compounds and dienic compounds or their hydrogenated versions, and the tackifier comprising alicyclic hydrocarbon polymers therein, so that the composition has an excellent adhesion at low temperatures, but also the composition retains a high adhesion to polyethylene, polypropylene, polyethylene terephthalate, polyvinyl chloride and the like when being heated in, for example, hot water or microwave ovens.

The invention will now be described with reference to examples, which however are not not to be construed as limiting of the invention.

EXAMPLE 1

An amount of 33.3 parts by weight of a hydrogenated version of a block copolymer of styrene and butadiene (Kraton G-1657), 64.3 parts by weight of a tackifier (Alcon P-100) and 2.3 parts by weight of poly(4-methylpentene-1) having an intrinsic viscosity $[\eta]$ of 0.95 dl/g were melted and admixed at a rate of 50 rpm for 30 minutes under heating at 220° C., to provide a hot melt adhesive composition.

An amount of 33.3 parts by weight of a block copolymer of styrene and ethylene/butene (Kraton G-1657) as a hydrogenated version of a copolymer of vinyl aromatic compounds and conjugated dienic compounds, 64.3 parts by weight of a tackifier (Alcon P-100) and 2.3 parts by weight of poly(4-methylpentene-1) having an intrinsic viscosity [η] of 0.95 dl/g were melted and admixed at a rate of 50 rpm for 30 minutes under heating at 220° C., to provide a hot melt adhesive composition.

The composition was coated in a thickness of 50 μm on a polyethylene terephthalate film, and then onto the film was heat-sealed stretched polypropylene film at 120° C., to provide a two-layered film of 25 mm wide and 10 mm thick. Then the two-layered film was heated at a rate of 25° C./hour with a load of 500 g added to one of the film of the layers, and the temperature was measured at which one of the layered films slipped down from the other, to determine the shear adhesion failure temperature according to ASTM D 816. The results are shown in Table 1 together with the melt viscosity of the composition at 180° C.

EXAMPLE 2

A hot melt adhesive composition was prepared using 33.3 parts by weight of Kraton G-1657, 62.0 parts by weight of Alcon P-100 and 4.6 parts by weight of poly(4-methylpentene-1) having an intrinsic viscosity [η] of 0.80 dl/g and otherwise in the same manner as in Example 1. The shear adhesion failure temperature and melt viscosity of the composition are shown in Table 1.

EXAMPLE 3

A polystyrene/polybutadiene/polystyrene block copolymer (Cariflex TR-1101) was used in place of Kraton G-1657, and otherwise in the same manner as in Example 1, a hot melt adhesive composition was prepared. The shear adhesion failure temperature and melt viscosity of the composition are shown in Table 1.

EXAMPLE 4

A hot melt adhesive composition was prepared using 50.0 parts by weight of Kraton G-1657, 49.2 parts by weight of Alcon P-100 and 0.8 parts by weight of poly(4-methylpentene-1) having an intrinsic viscosity [η] of 0.95 dl/g and otherwise in the same manner as in Example 1. The shear adhesion failure temperature and melt viscosity of the composition are shown in Table 1.

COMPARATIVE EXAMPLE 1

A hot melt adhesive composition was prepared using 33.3 parts by weight of Kraton G-1657 and 64.3 parts by weight of Alcon P-100, and otherwise in the same manner as in Example 1. The shear adhesion failure temperature and melt viscosity of the composition are shown in Table 1.

EXAMPLE 5

A hot melt adhesive composition was prepared using 80.0 parts by weight of Kraton G-1657, 16 parts by weight of Alcon P-100 and 5 parts by weight of poly(4-methylpentene-1) having an intrinsic viscosity [η] of 0.95 dl/g and otherwise in the same manner as in Example 1. The shear adhesion failure temperature and melt viscosity of the composition are shown in Table 1.

TABLE 1

|  |  | Shear adhesion failure temperature (°C.) | Melt viscosity (centipoise) |
|---|---|---|---|
| Examples | 1 | 93 | 50000 |
|  | 2 | 95 | 60000 |
|  | 3 | 94 | 60000 |
|  | 4 | 90 | 80000 |
|  | 5 | 84 | 100000 |
| Comparative | 1 | 60 | 48000 |

What is claimed is:

1. A hot melt adhesive composition which comprises:
   (a) a copolymer of a vinyl aromatic compound and a conjugated dienic compound or a hydrogenated copolymer of a vinyl aromatic compound and a conjugated dienic compound in an amount of about 20–70% by weight;
   (b) a tackifier comprising an alicyclic hydrocarbon polymer in an amount of about 30–80% by weight; and
   (c) a 4-methylpentene-1 polymer selected from the group consisting of a homopolymer of 4-methylpentene-1 and a copolymer of 4-methylpentene-1 in an amount of about 0.3–20% by weight, based on the composition, respectively, wherein said 4-methylpentene-1 copolymer contains 4-methylpentene-1 in an amount of not less than about 85 mole %.

2. The composition as claimed in claim 1 wherein said copolymer of a vinyl aromatic compound and a conjugated dienic compound if a block copolymer or a random copolymer.

3. The composition as claimed in claim 1 wherein said 4-methylpentene-1 polymer has an intrinsic viscosity of about 0.6–2.0 dl/g as measured in decalin at a temperature of 135° C.

4. The composition as claimed in claim 1 wherein said conjugated dienic compound is an aliphatic conjugated diene of 4–6 carbon atoms which may be substituted with halogen.

5. The composition as claimed in claim 2 wherein said block copolymer is of the formula

X—Y—X',

X—Y,

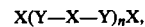

X(Y—X—Y)$_n$X, or

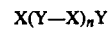

X(Y—X)$_n$Y wherein X and X' each represent a block composed of a vinyl aromatic compound, which may be the same or different, Y represents a block composed of a conjugated dienic compound, and n is in the range of 1–10.

6. The composition as claimed in claim 5 wherein said block copolymer has a number average molecular weight of about 10,000–1,000,000.

7. The composition as claimed in claim 6 wherein said block composed of a vinyl aromatic compound has an average molecular weight of about 1,000–500,000.

8. The composition as claimed in claim 6 wherein said block composed of a conjugated dienic compound has an average molecular weight of about 1,000–500,000.

9. The composition as claimed in claim 2 wherein said block copolymer contains said vinyl aromatic compound and said conjugated dienic compound in a weight ratio of vinyl aromatic compound to conjugated dienic compound of 2/98 to 60/40.

10. The composition as claimed in claim 1 wherein said hydrogenated copolymer of a vinyl aromatic compound and a conjugated dienic compound has not less than about 90% of aliphatic double bonds hydrogenated and not more than about 10% of aromatic double bonds hydrogenated.

* * * * *